(12) United States Patent
Chae et al.

(10) Patent No.: US 10,596,904 B2
(45) Date of Patent: Mar. 24, 2020

(54) POWERTRAIN FOR VEHICLE

(71) Applicants: Hyundai Motor Company, Seoul (KR); Kia Motors Corporation, Seoul (KR)

(72) Inventors: Min Ho Chae, Incheon (KR); Yong Uk Shin, Suwon-Si (KR); Soon Ki Eo, Ansan-Si (KR); Sun Sung Kwon, Anyang-Si (KR); Chon Ok Kim, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 2 days.

(21) Appl. No.: 16/194,825

(22) Filed: Nov. 19, 2018

(65) Prior Publication Data
US 2020/0039352 A1 Feb. 6, 2020

(30) Foreign Application Priority Data
Jul. 31, 2018 (KR) .......................... 10-2018-0089430

(51) Int. Cl.
*B60K 28/16* (2006.01)
*B60K 17/16* (2006.01)
*F16H 48/22* (2006.01)
*F16H 48/38* (2012.01)
*F16H 48/10* (2012.01)
(Continued)

(52) U.S. Cl.
CPC ............ *B60K 28/165* (2013.01); *B60K 17/16* (2013.01); *F16H 48/22* (2013.01); *F16H 48/38* (2013.01); *F16D 13/42* (2013.01); *F16H 48/08* (2013.01); *F16H 48/10* (2013.01)

(58) Field of Classification Search
None
See application file for complete search history.

(56) References Cited

U.S. PATENT DOCUMENTS 5,951,433 A * 9/1999 Tsukamoto ............. F16H 3/663
475/281
2004/0029673 A1* 2/2004 Lipman ............... B60K 17/3462
475/284
(Continued)

FOREIGN PATENT DOCUMENTS
KR 20120118925 A 10/2012

*Primary Examiner* — Justin Holmes
(74) *Attorney, Agent, or Firm* — Morgan, Lewis & Bockius LLP

(57) ABSTRACT

A powertrain for a vehicle, may include a first planetary gear set having three rotation elements, with an input shaft connected to a first rotation element of the three rotation elements; an output shaft connected to a second rotation element of the first planetary gear set; a differential connected to the output shaft; a brake configured to lock or release a third rotation element of the first planetary gear set; a hub connected to the second rotation element through a clutch; and a sleeve unit restricted in rotation with respect to the hub and configured to be linearly slidable along an axial direction of the first planetary gear set to change a restriction state of relative rotation between a selected driveshaft of two driveshafts receiving power from the differential, the second rotation element, the third rotation element, and the hub by linear sliding.

12 Claims, 8 Drawing Sheets

(51) Int. Cl.
*F16D 13/42* (2006.01)
*F16H 48/08* (2006.01)

(56) References Cited

U.S. PATENT DOCUMENTS

2009/0242336 A1* 10/2009 Homma ................. F16D 55/30
188/71.5
2017/0219078 A1* 8/2017 Wang ...................... F16H 48/36

* cited by examiner

FIG. 2

| Mode | B1 | CL | SB |
|---|---|---|---|
| $1^{st}$-LSD | O | O | 1lsd |
| $1^{st}$ | O | – | 1d |
| $1^{st} \leftrightarrow 2^{nd}$ shift | △ | △ | 2s |
| $2^{nd}$ | – | – | 2d |
| $2^{nd}$-LSD |  | O | 2lsd |

POWERTRAIN FOR VEHICLE

CROSS REFERENCE TO RELATED APPLICATION

The present application claims priority to Korean Patent Application No. 10-2018-0089430, filed Jul. 31, 2018, the entire contents of which is incorporated herein for all purposes by this reference.

BACKGROUND OF THE INVENTION

Field of the Invention

The present invention relates generally to a powertrain for a vehicle. More particularly, the present invention relates to a configuration of a powertrain for a vehicle having a limited slip differential (LSD) function.

Description of Related Art

In a powertrain for a vehicle, a differential is essential, but on a low friction road or a rough road, the vehicle cannot be driven by differential action. To solve this, it is necessary to have LSD function in powertrain.

The powertrain is configured to implement the LSD function and have low power transmission loss while having a simple structure, thus ensuring high power transmission efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a vehicle, the powertrain being configured to realize the LSD function while having a simple structure, and ensure high power transmission efficiency by minimizing the power transmission loss during running of the vehicle, improving driving performance, fuel economy and mileage of a vehicle.

In various aspects of the present invention, there is provided a powertrain for a vehicle including: a first planetary gear set having three rotation elements, with an input shaft connected to a first rotation element of the three rotation elements; an output shaft connected to a second rotation element of the first planetary gear set; a differential connected to the output shaft; a brake configured to lock or release a third rotation element of the first planetary gear set; a hub connected to the second rotation element through a clutch; and a sleeve unit restricted in rotation with respect to the hub and configured to be linearly slidable along an axial direction of the first planetary gear set to change a restriction state of relative rotation between a selected driveshaft of two driveshafts receiving power from the differential, the second rotation element, the third rotation element, and the hub by linear sliding.

As the sleeve unit moves from a first side to a second side in a section where the linear sliding is possible, five different restriction states of relative rotation between the selected driveshaft, the second rotation element, and the third rotation element, and the hub may be sequentially formed.

The five different restriction states of relative rotation formed by linear sliding of the sleeve unit may be the first restriction state 11sd, the second restriction state 1d, the third restriction state 2s, the fourth restriction state 2d, and the fifth restriction state 2lsd, respectively, wherein the first restriction state 11sd may be a state where the sleeve unit restricts relative rotation between the selected driveshaft and the hub; the second restriction state 1d may be a state where the sleeve unit is restricted in relative rotation with the hub; the third restriction state 2s may be a state where the sleeve unit restricts relative rotation between the third rotation element and the hub; the fourth restriction state 2d may be a state where the sleeve unit restricts relative rotation between the second rotation element and the third rotation element; and the fifth restriction state 2lsd may be a state where the sleeve unit restricts relative rotation between the selected driveshaft and the hub, restricts relative rotation between the second rotation element and the third rotation element, and allows relative rotation between the hub and the second rotation element.

The sleeve unit may include: a first sleeve linearly slidably provided in the hub to change the restriction state of relative rotation between the hub, the selected driveshaft, and the third rotation element; and a second sleeve configured such that rotation with respect to the first sleeve is allowed and linear sliding along the axial direction of the first planetary gear set is restricted, to change a restriction state of relative rotation between the second rotation element and the third rotation element by linear sliding along with the first sleeve.

The first planetary gear set may be a single pinion simple planetary gear set; and the first rotation element of the first planetary gear set may be a first sun gear, the second rotation element may be a first planet carrier, and the third rotation element may be a first ring gear.

The input shaft connected to the first rotation element of the first planetary gear set may be connected to a motor through a reducer.

The reducer may include: a first reduction unit having a drive gear connected to a rotation shaft of the motor and a driven gear externally engaged with the drive gear; and a second reduction unit having a second planetary gear set configured to decelerate a rotational force of the driven gear and output the rotational force to the input shaft.

The second planetary gear set forming the second reduction unit may be a single pinion simple planetary gear set including a second sun gear connected to the driven gear, a second ring gear fastened to a transmission housing, and a second planet carrier connected to the input shaft.

The present invention is configured to realize the LSD function while having a simple structure, and ensure high power transmission efficiency by minimizing the power transmission loss during running of the vehicle, improving driving performance, fuel economy and mileage of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation mode table of the powertrain of the present invention;

Figure 1:
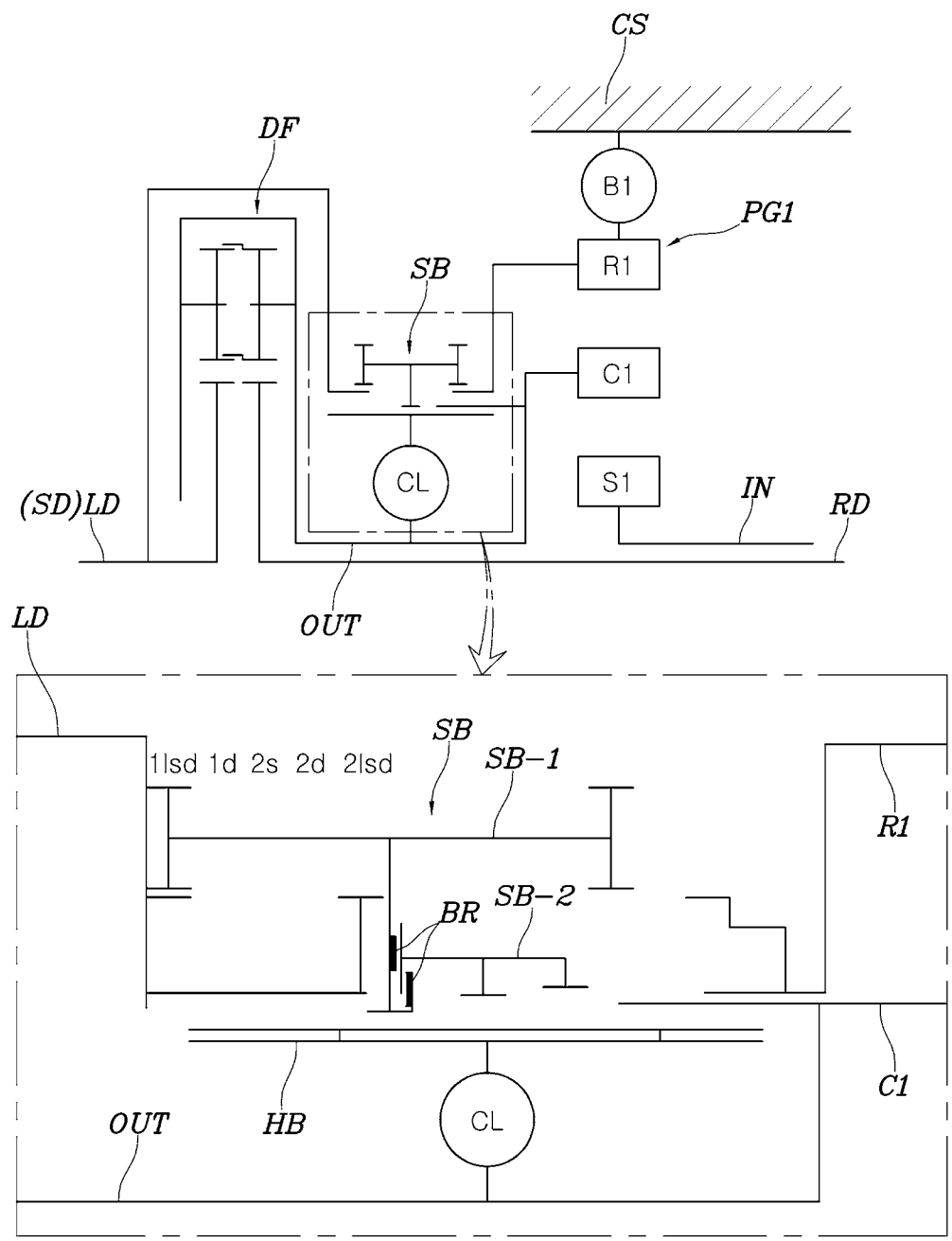
FIG. 1 is a view showing a structure of a powertrain for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, a multi-stage transmission for a vehicle according to exemplary embodiments of the present invention will be described in detail with reference to the accompanying drawings.

Referring to FIGS. 1 to 7, a powertrain for a vehicle according to an exemplary embodiment of the present invention includes: a first planetary gear set PG1 having three rotation elements, with an input shaft IN connected to a first rotation element of the three rotation elements; an output shaft OUT connected to a second rotation element of the first planetary gear set PG1; a differential DF connected to the output shaft OUT; a brake B1 configured to lock or release a third rotation element of the first planetary gear set PG1; a hub HB connected to the second rotation element through a clutch CL; a sleeve unit SB restricted in rotation with respect to the hub HB and configured to be linearly slidable along an axial direction of the first planetary gear set PG1 to change a restriction state of relative rotation between a selected driveshaft SD of two driveshafts receiving power from the differential DF, the second rotation element, the third rotation element, and the hub HB by linear sliding.

The above described powertrain is configured to allow the power input to the first planetary gear set PG1 to be shifted to the output shaft OUT, and also to limit the differential function of the differential DF by operating the sleeve unit SB and the clutch CL.

The sleeve unit SB is configured to sequentially form five different restriction states of relative rotation between the selected driveshaft SD, the second rotation element, the third rotation element, and the hub HB as the sleeve unit moves from a first side to a second side in a section where the linear sliding is possible.

Of course, the sleeve unit SB is configured to be slid by a separate actuator to be moved to five positions that can form the five restriction states of relative rotation.

The five different restriction states of relative rotation formed by linear sliding of the sleeve unit SB are a first restriction state 1lsd, a second restriction state 1d, a third restriction state 2s, a fourth restriction state 2d, and a fifth restriction state 2lsd, respectively.

The first restriction state 1lsd is a state where the sleeve unit SB restricts relative rotation between the selected driveshaft SD and the hub HB; the second restriction state 1d is a state where the sleeve unit SB is restricted in relative rotation with the hub HB; the third restriction state 2s is a state where the sleeve unit SB restricts relative rotation between the third rotation element and the hub HB; the fourth restriction state 2d is a state where the sleeve unit SB restricts relative rotation between the second rotation element and the third rotation element; the fifth restriction state 2lsd is a state where the sleeve unit SB restricts relative rotation between the selected driveshaft SD and the hub HB, restricts relative rotation between the second rotation element and the third rotation element, and allows relative rotation between the hub HB and the second rotation element.

The first restriction state 1lsd is configured for implementing the LSD function in the first gear state, the second restriction state 1d is the first gear state and the LSD function cannot be implemented, the third restriction state 2s is used during the shift from the first gear stage to the second gear stage or the shift from the second gear stage to the first gear stage, the fourth restriction state 2d is the second gear state and the LSD function cannot be implemented, and the fifth restriction state 2lsd is configured for implementing the LSD function in the second gear state.

The sleeve unit SB includes: a first sleeve SB-1 linearly slidably provided in the hub HB to change the restriction state of relative rotation between the hub HB, the selected driveshaft SD, and the third rotation element; and a second sleeve SB-2 configured such that rotation with respect to the first sleeve SB-1 is allowed and linear sliding along the axial direction of the first planetary gear set PG1 is restricted, to change a restriction state of relative rotation between the second rotation element and the third rotation element by linear sliding along with the first sleeve SB-1.

Of course, the first sleeve SB-1 and the second sleeve SB-2 are connected to each other by use of a bearing BR as shown in the drawing to allow the rotation of the second sleeve SB-2 with respect to the first sleeve SB-1.

In the exemplary embodiment of the present invention, the first planetary gear set PG1 includes a planetary gear set having a single pinion, wherein the first rotation element of the first planetary gear set PG1 is a first sun gear S1, and the second rotation element is a first planet carrier C1, and the third rotation element is a first ring gear R1.

Accordingly, the first sun gear S1 of the first planetary gear set PG1 may be directly connected to a power source such as a motor via the input shaft IN.

For reference, the differential DF shown in FIG. 1 refers to a spur-gear differential, but the present invention is not limited thereto and a general differential configuration using bevel gear may be used.

Furthermore, the brake B1, the clutch CL, and the sleeve unit SB are configured to be controlled by a separate controller.

The five restriction states of relative rotation selected by linear sliding of the sleeve unit SB will be described with reference to FIGS. 3 to 7.

Figure 3:
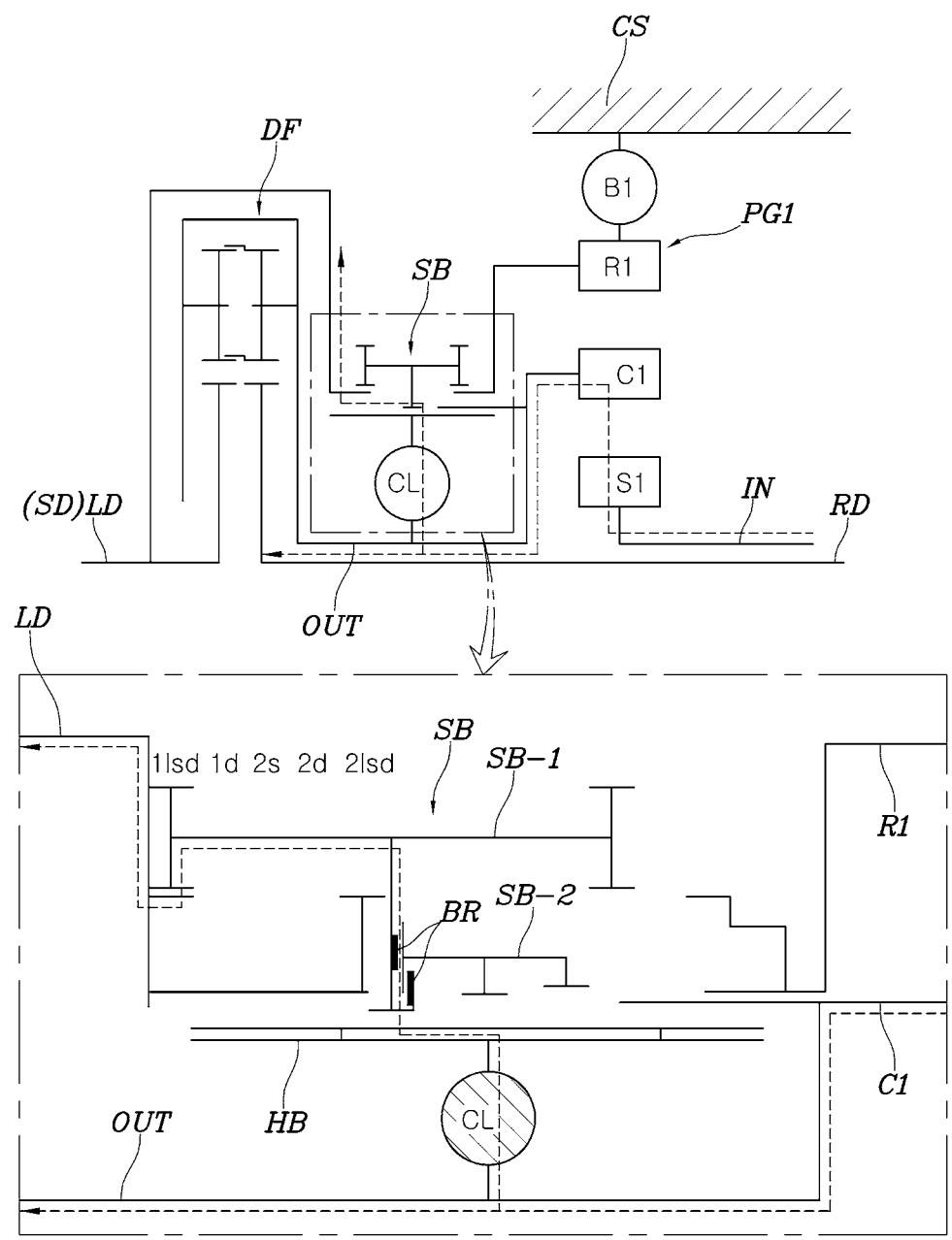
FIG. 3 is a view showing a state where the powertrain of FIG. 1 forms a first stage LSD.

FIG. 3 shows the first restriction state 1lsd in which the sleeve unit SB is located at the leftmost position in the drawing, wherein as described above, the sleeve unit SB restricts the relative rotation between the hub HB and a left driveshaft LD, which is the selected driveshaft SD.

In other words, the sleeve unit SB is connected to the hub HB at the center thereof and connected to the selected driveshaft SD at the left side thereof such that the relative rotation between the hub HB and the selected driveshaft SD is restrained.

Here, the brake B1 is in the engaged state, wherein since the first ring gear R1 is locked by the brake B1, when power is applied to the first sun gear S1, the present power is decelerated to the first planet carrier C1 to form an output of the first gear stage through the output shaft OUT.

As described above, when the output of the first gear stage is transmitted to the differential DF through the output shaft OUT, under normal driving conditions, the power is appropriately distributed to the left driveshaft LD and the right driveshaft RD by the differential DF, thus achieving first gear running.

While the running at the first gear is implemented, in the case where the vehicle is running on a low friction road or a rough road and the LSD function is required, when the clutch CL is engaged, the output shaft OUT is connected to the left driveshaft LD, as the selected driveshaft, through the hub HB and the sleeve unit SB, whereby the differential function of the differential DF is limited, and the LSD function is implemented, whereby the power of the output shaft OUT is equally distributed to the left driveshaft LD and the right driveshaft RD.

Of course, according to driving conditions of the vehicle, it is also possible to adjust the ratio of the power distributed to the left driveshaft LD and the right driveshaft RD by adjusting the frictional force of the clutch CL.

For reference, in the exemplary embodiment of the present invention, the selected driveshaft SD includes the left driveshaft LD, but the right driveshaft RD may be configured to be connectable to the sleeve unit SB, to be the selected driveshaft SD.

Figure 4:
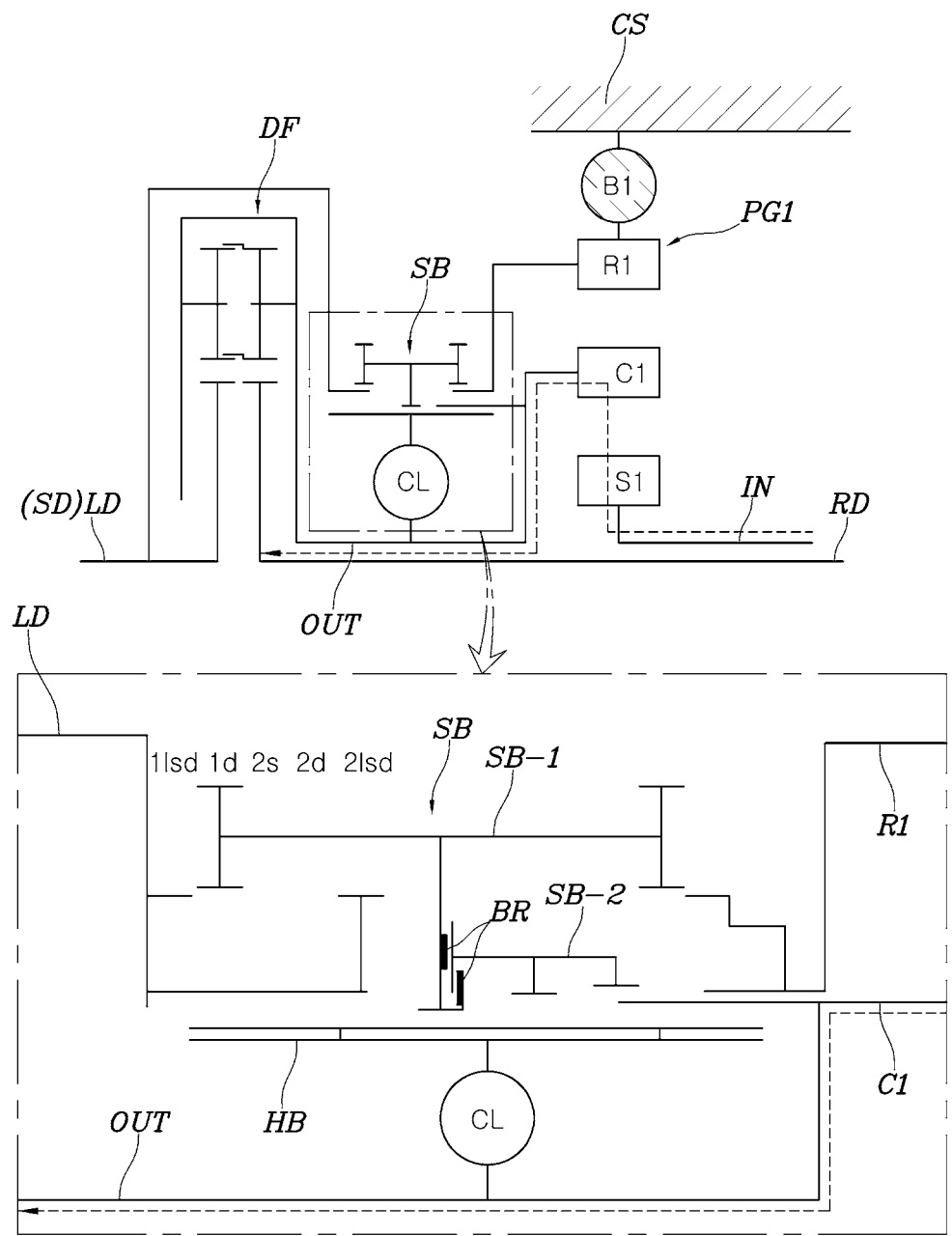
FIG. 4 is a view showing a state where the powertrain of FIG. 1 forms a first gear state.

FIG. 4 shows the second restriction state 1d in which the first gear state is implemented.

The sleeve unit SB is shifted to the right by one stage as compared with FIG. 3, wherein the relative rotation only with the hub HB is substantially restricted, and the relative rotation with the selected driveshaft SD, the second rotation element, or the third rotation element is not restricted.

Meanwhile, the brake B1 is in the engaged state, wherein the power of the input shaft IN is input to the first sun gear S1 is decelerated through the first planet carrier C1 and provides an output of the first gear stage to the output shaft OUT; and the power of the output shaft OUT is appropriately distributed by the differential DF and is output to the left driveshaft LD and the right driveshaft RD.

Of course, in the instant state in the instant state, even if the clutch CL is activated, the LSD function cannot be implemented since the sleeve unit SB is not connected to the selected driveshaft SD. However, the present condition can contribute to improving the power transmission efficiency of the vehicle by minimizing the drag of the clutch CL.

Figure 5:
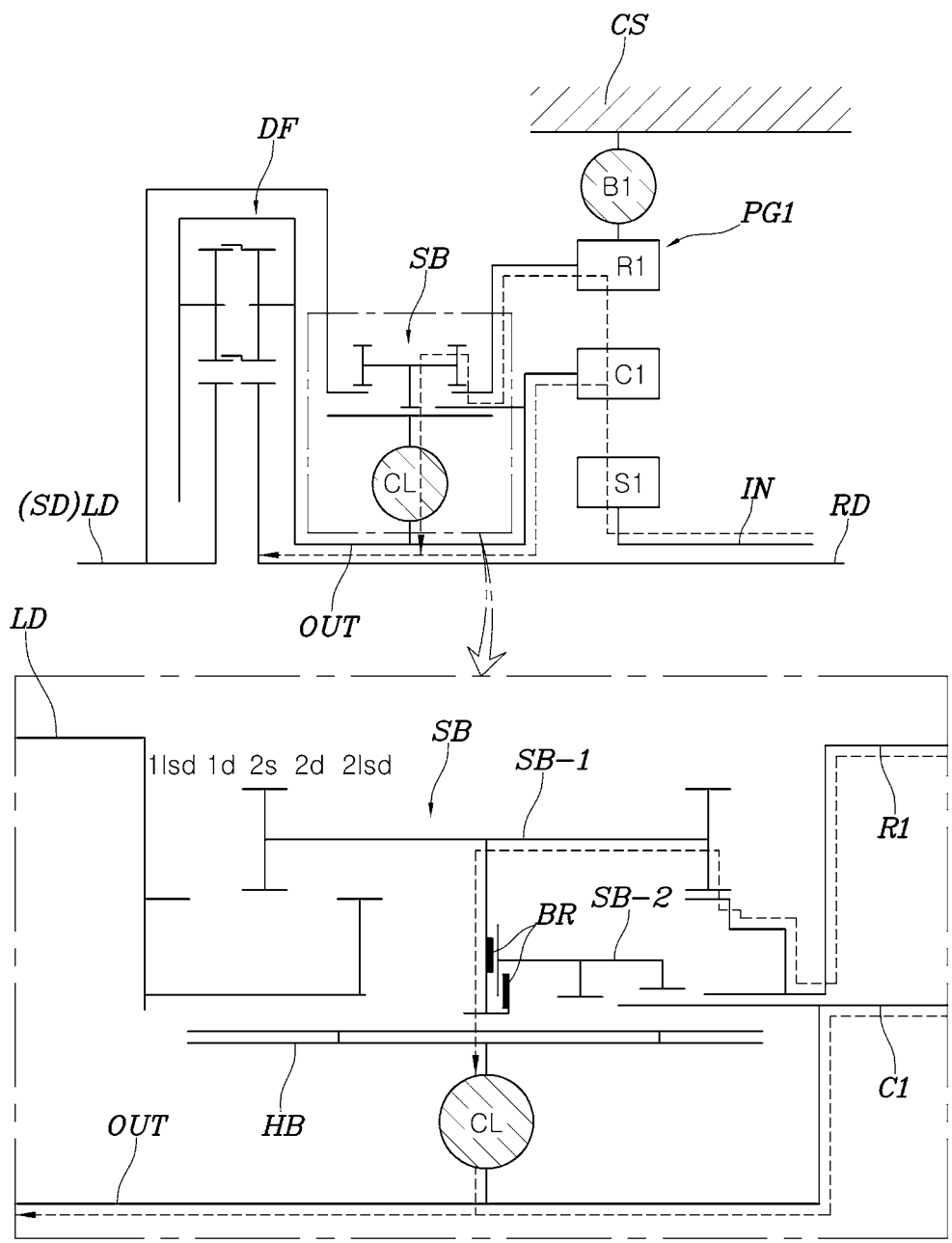
FIG. 5 is a view showing a state where the powertrain of FIG. 1 forms a $1^{st}$-$2^{nd}$ shift state.

FIG. 5 shows that the sleeve unit SB is in the third restriction state 2s, which is used during the shift from the first gear stage to the second gear stage or the shift from the second gear stage to the first gear stage, whereby a clutch-to-clutch shifting is implemented to allow smooth shifting.

In other words, the sleeve unit SB restricts the relative rotation between the hub HB and the first ring gear R1, as the third rotation element. For example, to shift from the first gear stage to the second gear stage, the clutch CL is engaged while releasing the brake B1, such that the first ring gear R1 and the first planet carrier C1 are restricted to each other, and the power input to the first sun gear S1 becomes the second gear stage of 1:1 gear ratio and is output to the output shaft OUT.

Of course, on the contrary, to shift from the second gear stage to the first gear stage, in the state of implementing the second gear stage where the clutch CL is engaged, the brake B1 is engaged while releasing the clutch CL, smoothly shifting to the first gear stage.

Figure 6:
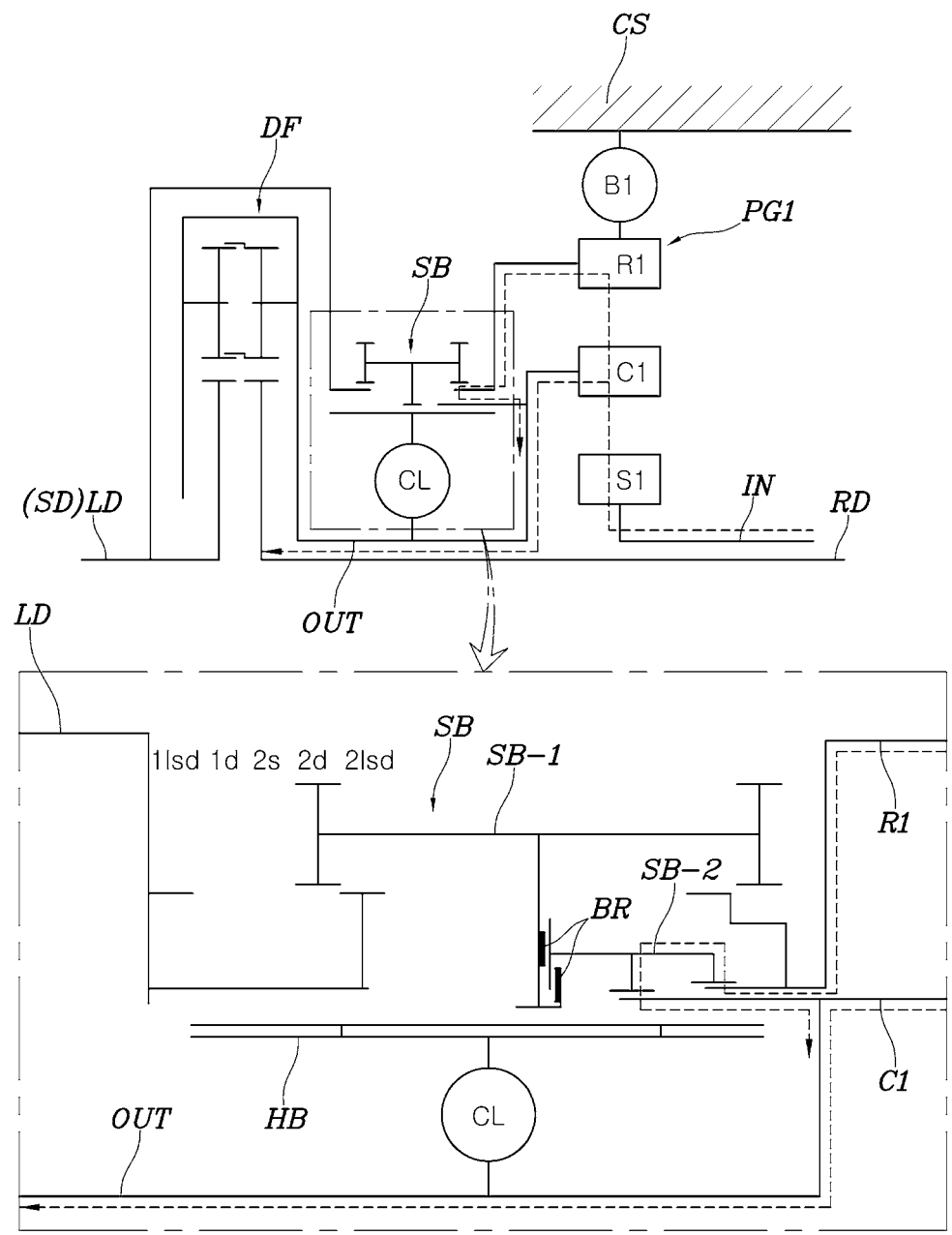
FIG. 6 is a view showing a state where the powertrain of FIG. 1 forms a second gear state.

FIG. 6 shows that the sleeve unit SB is located in the fourth restriction state 2d state and forms the second gear stage.

In other words, the clutch CL is engaged by the state shown in FIG. 5 to release the brake B1 and the second gear stage is implemented, and then the state is changed to the state shown in FIG. 6, such that the second rotation element and the third rotation element are continuously engaged with each other by the sleeve unit SB without operating the clutch CL to be continuously engaged, whereby it is possible to stably maintain the second gear stage while eliminating power consumption to drive the clutch CL.

Of course, here, the relative rotation between the second rotation element and the third rotation element is substantially restricted by the second sleeve SB-2 of the sleeve unit SB, and the second sleeve SB-2 is allowed to rotate relative to the first sleeve SB-1.

Figure 7:
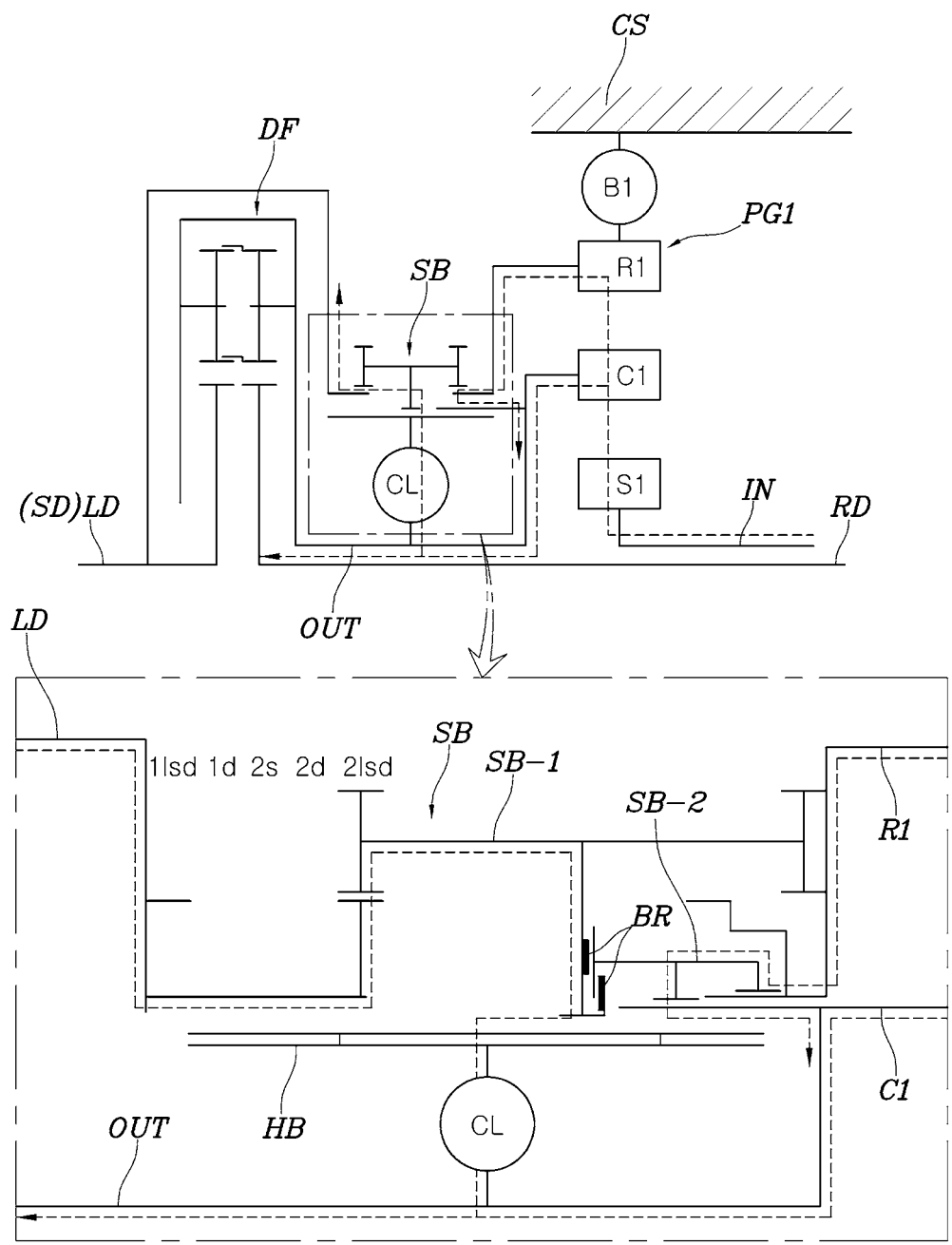
FIG. 7 is a view showing a state where the powertrain of FIG. 1 forms a second state LSD.

FIG. 7 shows that the sleeve unit SB is located in the fifth restriction state 2lsd and is configured for implementing the LSD function during running at the second gear stage.

As shown in the drawing, the sleeve unit SB is moved to the rightmost position, wherein the relative rotation between the hub HB and the selected driveshaft SD is restricted by the first sleeve SB-1, and the relative rotation between the second rotation element and the third rotation element is restricted by the second sleeve SB-2.

Since the second rotation element and the third rotation element are restricted, the power input to the first sun gear S1 is output to the output shaft OUT as it is, forming an output of the second gear stage, and when the clutch CL is engaged in the instant state, the output shaft OUT and the selected driveshaft SD are connected by the first sleeve SB-1, whereby the LSD function may be implemented.

Figure 8:
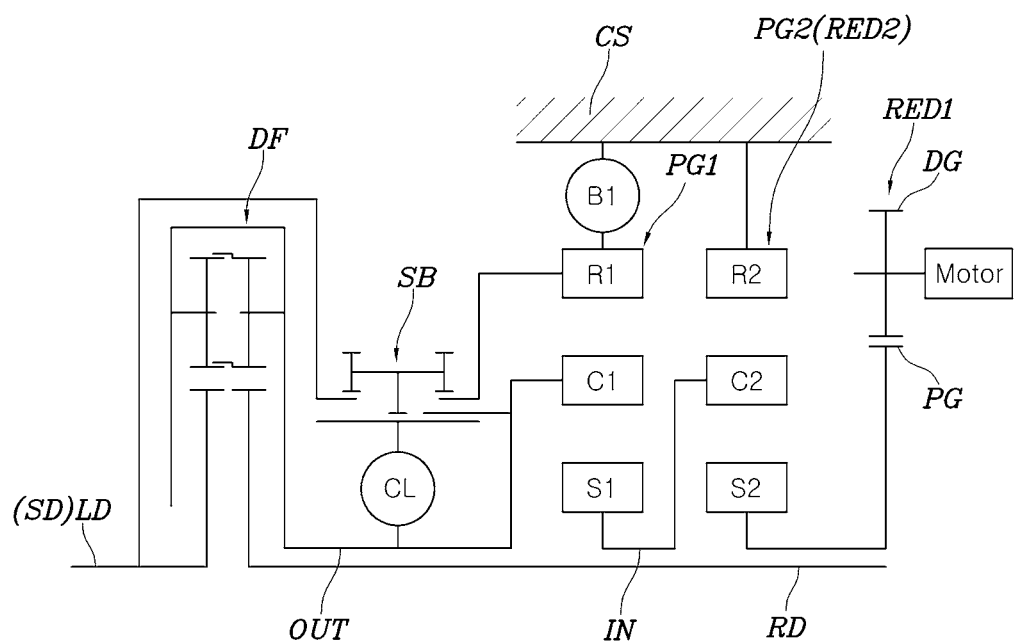
FIG. 8 is a view showing another exemplary embodiment of the present invention.

Meanwhile, FIG. 8 shows another exemplary embodiment of the present invention, wherein the configuration of FIG. 1 is used as it is, but the input shaft IN is configured to be connected to a motor through a reducer.

The reducer includes: a first reduction unit RED1 having a drive gear DG connected to a rotation shaft of the motor and a driven gear PG externally engaged with the drive gear DG; and a second reduction unit RED2 having a second planetary gear set PG2 configured to decelerate a rotational force of the driven gear PG and output the same to the input shaft IN.

The second planetary gear set PG2 forming the second reduction unit RED2 unit is a single pinion simple planetary gear set including a second sun gear S2 connected to the driven gear PG, a second ring gear R2 fastened to a transmission housing CS, and a second planet carrier C2 connected to the input shaft IN.

In other words, the power of the motor is firstly decelerated by the gear ratio of the drive gear DG and driven gear PG, then is secondly decelerated by the gear ratio of the second planetary gear set PG2, and is transmitted to the first planetary gear set PG1 through the input shaft IN.

This makes it possible to provide a required driving force of a vehicle while reducing the capacity of the motor, improving the fuel economy of the vehicle and increasing the mileage.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A powertrain apparatus for a vehicle, the powertrain apparatus comprising:
   an input shaft;
   a first planetary gear set including first, second, and third rotation elements, wherein the input shaft is fixedly connected to the first rotation element of the first planetary gear set;
   an output shaft fixedly connected to the second rotation element of the first planetary gear set;
   a differential connected to the output shaft;
   a brake configured to lock or release the third rotation element of the first planetary gear set;
   a hub selectively connected to the second rotation element through a clutch; and
   a sleeve unit restricted in rotation with respect to the hub and configured to be linearly slidable along an axial direction of the first planetary gear set to change a restriction state of relative rotation between a selected driveshaft of two driveshafts receiving power from the differential, the second rotation element of the first planetary gear set, the third rotation element of the first planetary gear set, and the hub by linear sliding.

2. The powertrain of claim 1, wherein the brake is configured to selectively connect the third rotation element of the first planetary gear set to a transmission housing.

3. The powertrain of claim 1, wherein as the sleeve unit moves from a first side to a second side in a predetermined section configured for the linear sliding, five different restriction states of relative rotation between the selected driveshaft, the second rotation element of the first planetary gear set, and the third rotation element of the first planetary gear set, and the hub are sequentially formed.

4. The powertrain of claim 3, wherein the five different restriction states include a first restriction state, a second restriction state, a third restriction state, a fourth restriction state, and a fifth restriction state,
   wherein the first restriction state is a state where the sleeve unit restricts relative rotation between the selected driveshaft and the hub,
   wherein the second restriction state is a state where the sleeve unit is restricted in relative rotation with the hub,
   wherein the third restriction state is a state where the sleeve unit restricts relative rotation between the third rotation element of the first planetary gear set and the hub,
   wherein the fourth restriction state is a state where the sleeve unit restricts relative rotation between the second rotation element of the first planetary gear set and the third rotation element of the first planetary gear set, and
   wherein the fifth restriction state is a state where the sleeve unit restricts relative rotation between the selected driveshaft and the hub, restricts relative rotation between the second rotation element of the first planetary gear set and the third rotation element of the first planetary gear set, and allows relative rotation between the hub and the second rotation element of the first planetary gear set.

5. The powertrain of claim 1, wherein the sleeve unit includes:
   a first sleeve linearly slidably provided in the hub to change the restriction state of the relative rotation between the hub, the selected driveshaft, and the third rotation element of the first planetary gear set; and
   a second sleeve wherein rotation with respect to the first sleeve is allowed and linear sliding along the axial direction of the first planetary gear set is restricted, to change a restriction state of relative rotation between the second rotation element of the first planetary gear set and the third rotation element of the first planetary gear set by linear sliding along with the first sleeve.

6. The powertrain of claim 4,
   wherein the first planetary gear set is a planetary gear set having a single pinion, and
   wherein the first rotation element of the first planetary gear set is a first sun gear, the second rotation element of the first planetary gear set is a first planet carrier, and the third rotation element of the first planetary gear set is a first ring gear.

7. The powertrain of claim 1, wherein the input shaft fixedly connected to the first rotation element of the first planetary gear set is connected to a motor through a reducer.

8. The powertrain of claim 7, wherein the reducer includes:
   a first reduction unit having a drive gear connected to a rotation shaft of the motor and a driven gear engaged with the drive gear; and
   a second reduction unit having a second planetary gear set configured to decelerate a rotational force of the driven gear and output the rotational force to the input shaft.

9. The powertrain of claim 8,
   wherein the second planetary gear set forming the second reduction unit includes first, second, and third rotation elements, and
   wherein the first rotation element of the second planetary gear set is fixedly connected to the driven gear, wherein the second rotation element of the second planetary gear set is fixedly connected to the input shaft which is fixed to the first rotation element of the first planetary gear set, and wherein the third rotation element of the second planetary gear set is fixedly connected to a transmission housing.

10. The powertrain of claim 9, wherein the second planetary gear set forming the second reduction unit is a planetary gear set having a single pinion, and wherein the first rotation element of the second planetary gear set is a second sun gear fixedly connected to the driven gear, wherein the second rotation element of the second planetary gear set is a second planet carrier connected to the input shaft which is fixed to the first rotation element of the first planetary gear set, and wherein the third rotation element of the second planetary gear set is a second ring gear fixedly connected to a transmission housing.

11. The powertrain of claim 7, wherein the first planetary gear set is a planetary gear set having a single pinion, wherein the first rotation element of the first planetary gear set is a first sun gear, the second rotation element of the first planetary gear set is a first planet carrier, and the third rotation element of the first planetary gear set is a first ring gear, and wherein the reducer includes:

a first reduction unit having a drive gear connected to a rotation shaft of the motor and a driven gear engaged with the drive gear; and a second reduction unit having a second planetary gear set connected to the first planetary gear set via the input shaft and configured to decelerate a rotational force of the driven gear and output the rotational force to the input shaft.

12. The powertrain of claim 11, wherein the second planetary gear set forming the second reduction unit is a planetary gear set having a single pinion and including:

a second sun gear fixedly connected to the driven gear;

a second ring gear fixedly connected to a transmission housing; and a second planet carrier fixedly connected to the sun gear of the first planetary gear set via the input shaft.

* * * * *